United States Patent
Doblar

(10) Patent No.: US 7,822,110 B1
(45) Date of Patent: Oct. 26, 2010

(54) EYE DIAGRAM DETERMINATION DURING SYSTEM OPERATION

(75) Inventor: Drew G. Doblar, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 1221 days.

(21) Appl. No.: 11/243,036

(22) Filed: Oct. 4, 2005

(51) Int. Cl.
*H04B 3/46* (2006.01)

(52) U.S. Cl. .................. 375/224; 375/226; 375/227

(58) Field of Classification Search .................. 375/224, 375/226, 227
See application file for complete search history.

(56) References Cited

U.S. PATENT DOCUMENTS

| | | | |
|---|---|---|---|
| 6,944,692 | B2 | 9/2005 | Smith et al. |
| 7,225,370 | B2 * | 5/2007 | Chow et al. ................. 714/700 |
| 7,472,318 | B2 * | 12/2008 | Fan et al. ..................... 714/704 |
| 2004/0268190 | A1 * | 12/2004 | Kossel et al. ................ 714/704 |
| 2005/0111536 | A1 * | 5/2005 | Cranford et al. ............ 375/226 |
| 2005/0281355 | A1 * | 12/2005 | Cranford et al. ............ 375/316 |
| 2006/0107154 | A1 * | 5/2006 | Bansal et al. ................ 714/738 |
| 2006/0139033 | A1 * | 6/2006 | Forey et al. .................. 324/638 |
| 2006/0195744 | A1 * | 8/2006 | Petersen ...................... 714/741 |
| 2006/0285584 | A1 * | 12/2006 | Baumgartner et al. ....... 375/226 |
| 2008/0208510 | A1 * | 8/2008 | Moessinger et al. ......... 702/122 |

OTHER PUBLICATIONS

"Multi-Gigabit SerDes: The Cornerstone of High Speed Serial Interconnects", Chen, Multi-Gigabit SerDes White Paper, Genesys Logic, Sep. 2003.

* cited by examiner

*Primary Examiner*—Shuwang Liu
*Assistant Examiner*—Kenneth Lam
(74) *Attorney, Agent, or Firm*—Rory D. Rankin; Meyertons, Hood, Kivlin, Kowert & Goetzel, P.C.

(57) ABSTRACT

A system for testing a communications link. A system includes a transmitter, a receiver, a digital communications link, and a service processor. The digital communications link includes a plurality of lanes through which the transmitter is coupled to the receiver. During an operating mode of the digital communications link and during otherwise normal system operation, the service processor (a) switches a selected one of the plurality of lanes from the operating mode to a test mode, (b) performs an eye scan of the selected lane, (c) stores data corresponding to the eye scan of the selected lane, and (d) returns the selected lane to the operating mode.

17 Claims, 5 Drawing Sheets

EYE DIAGRAM DETERMINATION DURING SYSTEM OPERATION

BACKGROUND OF THE INVENTION

1. Field of the Invention

This invention relates to communications links between integrated circuits and, more particularly, to testing of communications links between integrated circuits during system operation.

2. Description of the Related Art

Increasing bandwidth demands on communications links between integrated circuits have led to designs that replace wide parallel links with very high-speed serial links, thereby potentially simplifying circuit board layout and reducing timing skew problems while achieving higher net bandwidth. Multi-gigabit-per-second serial links have become a common means for communicating data between integrated circuits on a single board or across a backplane between boards. In a typical serial communications link, a Serializer/Deserializer (SerDes) is used to convert a set of parallel signals to a serial bit stream and vice versa. Often, a multiple-byte set of signals is divided into 8-bit segments, each segment is converted into a serial bit stream, and the serial bit streams are grouped together to form a communications link. In such an arrangement, each serial bit stream may be referred to as a lane and a link comprises several lanes.

At multi-gigabit per second speeds, the analog properties of digital waveforms affect the performance of a serial communications link. In particular, the voltage levels representing "0" and "1" and the timing of bit transitions compared to a reference clock may vary from bit to bit within a digital waveform. These voltage and timing variations are caused, in part, by noise radiated from nearby electrical signals and by electrical noise on power and ground connections. Voltage and timing of a particular bit are also affected by the values of other bits that are being transmitted and the history of bits transmitted over a given lane and its neighboring lanes.

A well-known test for characterizing a serial communications lane is the eye scan. In an eye scan, a pattern of ones and zeros is transmitted over a lane and the received signal is sampled either at a rate that is many times the bit rate or at many different phases within a bit time. The received signal is also independently sampled over a range of input voltage levels. The resulting samples are assembled to form a digital waveform. Time-slices of the digital waveform are superimposed to form a pattern that resembles an open eye. The size of the opening is a measure of the voltage and timing margin available on the lane. Eye scan testing is typically used for characterization and verification of individual components prior to their installation into a system assembly.

Once components are assembled into a system, the system operating environment presents stresses that may significantly alter the results of an eye scan. For instance, variability in the system assembly, electrical noise from nearby circuitry, and electrical noise from power and ground connections may affect the time and voltage margins seen in an eye scan, and consequently the performance of a serial communications lane. Unfortunately, the variability of the factors listed above may result in an assembly containing a communications link with poor time and/or voltage margins despite the fact that all components have passed individual screening tests. Testing with the actual electrical stress environment (including an applied stress stimulus on the lane under test as well as on nearby circuitry) and representative samples of system assemblies that account for variability in the quality of soldering, connector mating, handling, and general workmanship can be expected to more readily expose defects and poor margin performance than conventional component-level testing methods. Also, the characteristics of a given system assembly that may lead to an early decay of performance in the field may not be detected by conventional quality screening performed in a test environment. Therefore, a way to test individual communications lanes under normal system operating conditions is desired.

SUMMARY OF THE INVENTION

Various embodiments of a system including a transmitter, a receiver, a digital communications link, and a service processor are contemplated. In one embodiment, the digital communications link includes a plurality of lanes through which the transmitter is coupled to the receiver. During an operating mode of the digital communications link, the service processor is configured to (a) switch a selected one of the plurality of lanes from the operating mode to a test mode, (b) perform an eye scan of the selected lane, (c) store data corresponding to the eye scan of the selected lane, and (d) return the selected lane to the operating mode.

In another embodiment, the service processor is configured to analyze the eye scan to determine various characteristics, such as sample time, a high voltage threshold, and a low voltage threshold and convey the resulting sample time, high voltage threshold, and low voltage threshold to the receiver. The receiver is configured to sample the voltage of the selected lane at the sample time and compare the resulting voltage sample to the high and low voltage thresholds to determine whether the voltage sample represents a logic "0" or a logic"1". The resulting sampled data can be used to determine that a particular system assembly has sufficient operating electrical performance margin.

These and other embodiments are contemplated and disclosed in the following description.

Figure 1:
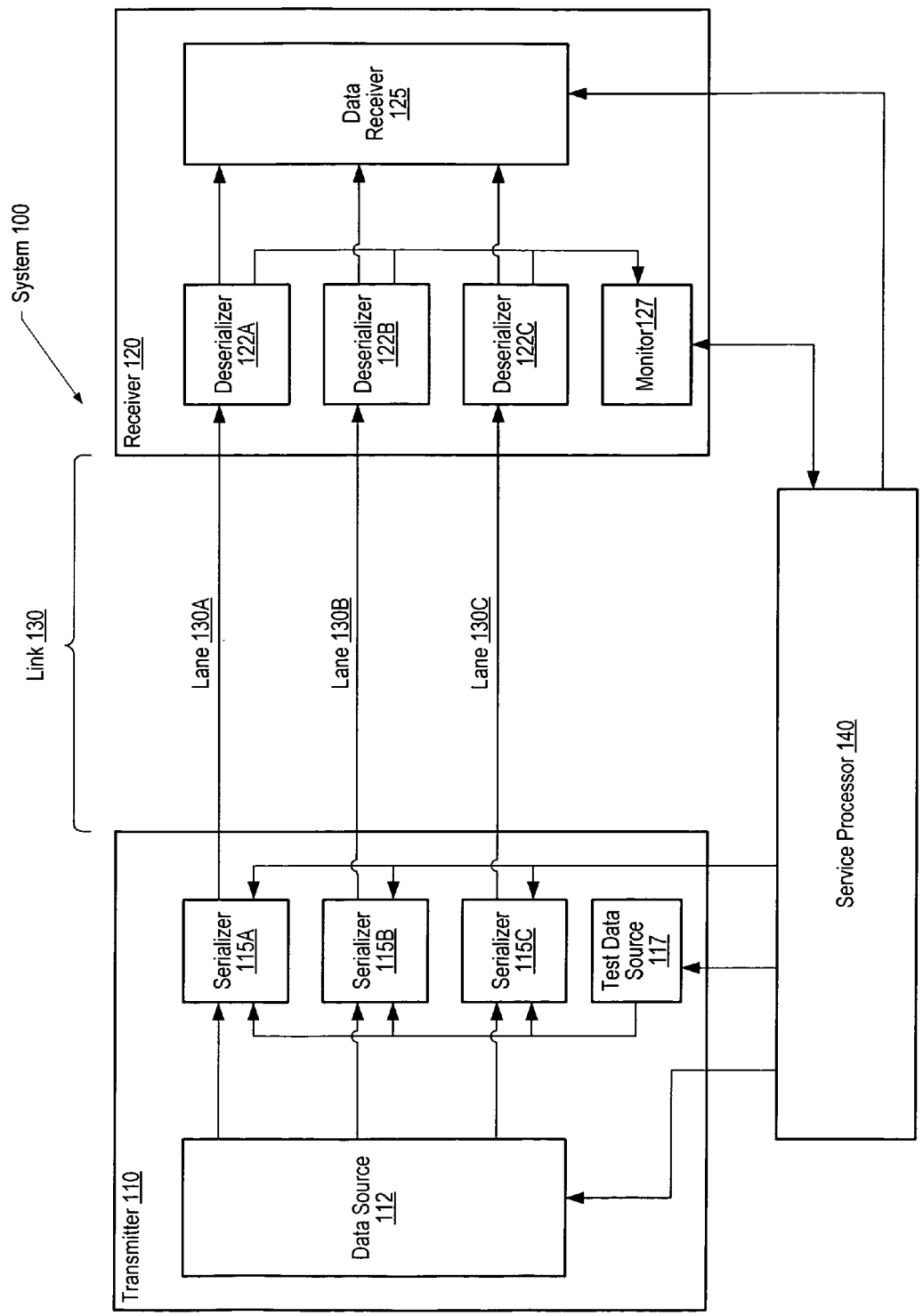
FIG. 1 is a generalized block diagram of one embodiment of a system that may perform eye scan testing of a serial communications link.

While the invention is susceptible to various modifications and alternative forms, specific embodiments are shown by way of example in the drawings and are herein described in detail. It should be understood, however, that drawings and detailed descriptions thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a generalized block diagram of a system 100 that may perform eye scan testing of a serial communications link. In one embodiment, system 100 includes a transmitter 110 coupled to a receiver 120 through link 130. A service processor 140 is provided to control the operation of communications between transmitter 110 and receiver 120. In the illustrated embodiment, link 130 includes lanes 130A-130C. It will be appreciated that link 130, in various embodiments, may include fewer than three or more than three lanes depending on design considerations such as space constraints, the number of bits in the parallel communications link, system cost, etc.

In one embodiment, transmitter 110 includes a data source 112 coupled to a set of serializers 115A-115C. Transmitter 110 may also include a test data source 117 that is coupled to each of serializers 115A-115C. Each of serializers 115A-115C may be configured by service processor 140 to accept input from either data source 112 or test data source 117. Similarly, receiver 120 includes a set of deserializers 122A-122C coupled to a data receiver 125. Deserializers 122A-122C may also be coupled to a monitor 127. As illustrated, each of serializers 115A-115C transmits data over a respective one of lanes 130A-130C to be received by deserializers 122A-122C.

During normal service operation, data source 112 may receive a parallel data stream and divide it into a set of parallel streams that are then supplied to serializers 115A-115C. For example, in one embodiment, data source 112 may receive data from a 24-bit wide parallel bus (not shown), divide the data into three byte-wide segments, and provide one segment to each of serializers 115A-115C. Data source 112 may be implemented as any of a variety of data distribution devices suitable for sub-dividing a wide parallel data stream into a number of narrower parallel streams such as a switching multiplexer or a slotted ring. In one embodiment, data source 112 is a slotted ring that receives data from a parallel bus and divides the data into a series of byte-wide sections. Each section may then be transmitted to one of serializers 115A-115C in round-robin fashion, or any other fashion deemed suitable. Each serializer 115A-115C may convert data from a parallel stream to a serial bit stream that is then transmitted over a respective one of lanes 130A-130C to receiver 120. If any of serializers 115A-115C, lanes 130A-130C, or deserializers 122A-122C is not operating properly or is otherwise not available, data source 112 may be directed by service processor 140 to not convey data to the serializer that corresponds to the unavailable lane. In this manner, communications link 130 may continue to operate even if one or more of lanes 130A-130C is unavailable for data communications.

Within receiver 120, deserializers 122A-122C may receive data from serializers 115A-115C over lanes 130A-130C respectively. Each of deserializers 122A-122C is configured to convert a serial bit stream to a parallel stream. Data receiver 125 may receive the parallel streams from each of deserializers 122A-122C and may re-assemble a wider parallel data stream. In one embodiment, monitor 127 may monitor the operation of each of lanes 130A-130C. For example, monitor 127 may perform any of a variety of data verification procedures such as a cyclic redundancy check (CRC) on the data received from each of deserializers 122A-122C. If the number of CRC errors that are detected exceeds a pre-determined threshold, monitor 127 may convey a signal to service processor 140 indicating that the performance of that lane is not acceptable. Service processor 140 may in turn convey a signal to data receiver 125, directing it to disable input from any of deserializers 122A-122C that correspond to a lane 130A-130C that is not operating properly or is otherwise not available. Data receiver 125 may be any of a variety of data aggregation devices suitable for transforming a number of narrow parallel data streams to a wider parallel data stream such as a de-multiplexer or a slotted ring. Monitor 127 may also have the ability to check the received correctness of data generated by the test data source. This test data may be a predetermined bit sequence or a pseudo-random bit stream.

System 100, as shown, includes a single transmitter 110 and a single receiver 120 and is capable of supporting and testing uni-directional communications. In an alternative embodiment, system 100 may include more than one transmitter and more than one receiver forming more than one uni-directional communications link. In further alternative embodiments, system 100 may include a number of individual integrated circuit devices that may be coupled to both a transmitter and a receiver such that bi-directional communications links are enabled between the devices. For example, in one embodiment, each of two or more devices may be coupled to both a data source and a data receiver. Each data source/data receiver pair may in turn be coupled to a SerDes. Individual SerDes may be coupled bi-directionally to other SerDes to form bi-directional lanes. By grouping a number of bi-directional lanes with a SerDes on each end of the lane, bi-directional communications links may be formed.

As illustrated in FIG. 1, transmitter 110 and receiver 120 may be separate components, such as an integrated circuit. Various alternative embodiments of system 100 are possible and contemplated. For example, in one alternative embodiment, a single integrated circuit may include both a transmitter 110 and a receiver 120 as well as various other circuitry. In another alternative embodiment, each of transmitter 110 and receiver 120 may be implemented as an assembly of discrete components.

In order to evaluate the performance of link 130, service processor 140 may initiate an eye scan test of lanes 130A-130C. During an eye scan test, in one implementation, service processor 140 may signal a selected one of the serializers 115A-115C that corresponds to the lane under test to enable its input from test data source 117. Service processor 140 may then direct monitor 127 to collect eye scan data from the deserializer 122A-122C that corresponds to the lane under test. Monitor 127 may then forward eye scan data to service processor 140 for analysis.

In an alternative implementation, during an eye scan test, service processor 140 may signal one of serializers 115A-115C to enable its input from test data source 117. Receiver 120 may detect which lane has been configured for eye scan testing through the CRC monitoring process described above. Since the CRC result obtained from a lane that is conveying test data will not match the CRC value expected for non-test data, receiver 120 may detect a CRC error from the lane under test. Service processor 140 may then direct data receiver 125 not to retrieve non-test data from the lane under test. Monitor 127 may then collect eye scan data from the lane under test and forward it to service processor 140 for analysis.

During an eye scan test, it may be desirable to operate the communications link to be tested under conditions that closely resemble the environment of worst case system electrical operation. In this sense, the use of the word "worst" is not necessarily intended to indicate an actual worst possible condition. Rather, as used herein, "worst" is intended to indicate a relatively bad environment or condition. To that end, in one embodiment, service processor 140 may configure data source 112 to transmit a stress test pattern designed to simulate the radiative noise environment of normal system operation. Additional stress stimuli may be applied to various circuits in system 100 to simulate (or "stimulate") a worst case background noise found on power and ground connections during normal system operation. In an alternative embodiment, a stress pattern may be designed to simulate/stimulate a worst-case radiative and power and ground noise environment in order to test the limits of link performance. Also, test data source 117 may transmit any of a variety of test patterns to the lane under test. For example, in one embodiment, test data source 117 may transmit a pseudo-random binary sequence (PRBS) to the lane under test. Receiver 120 is able to distinguish PRBS data from non-test data by performing a CRC. A PRBS may be one of a number of built-in self test (BIST) stimuli available from test data source 117.

Figure 2:
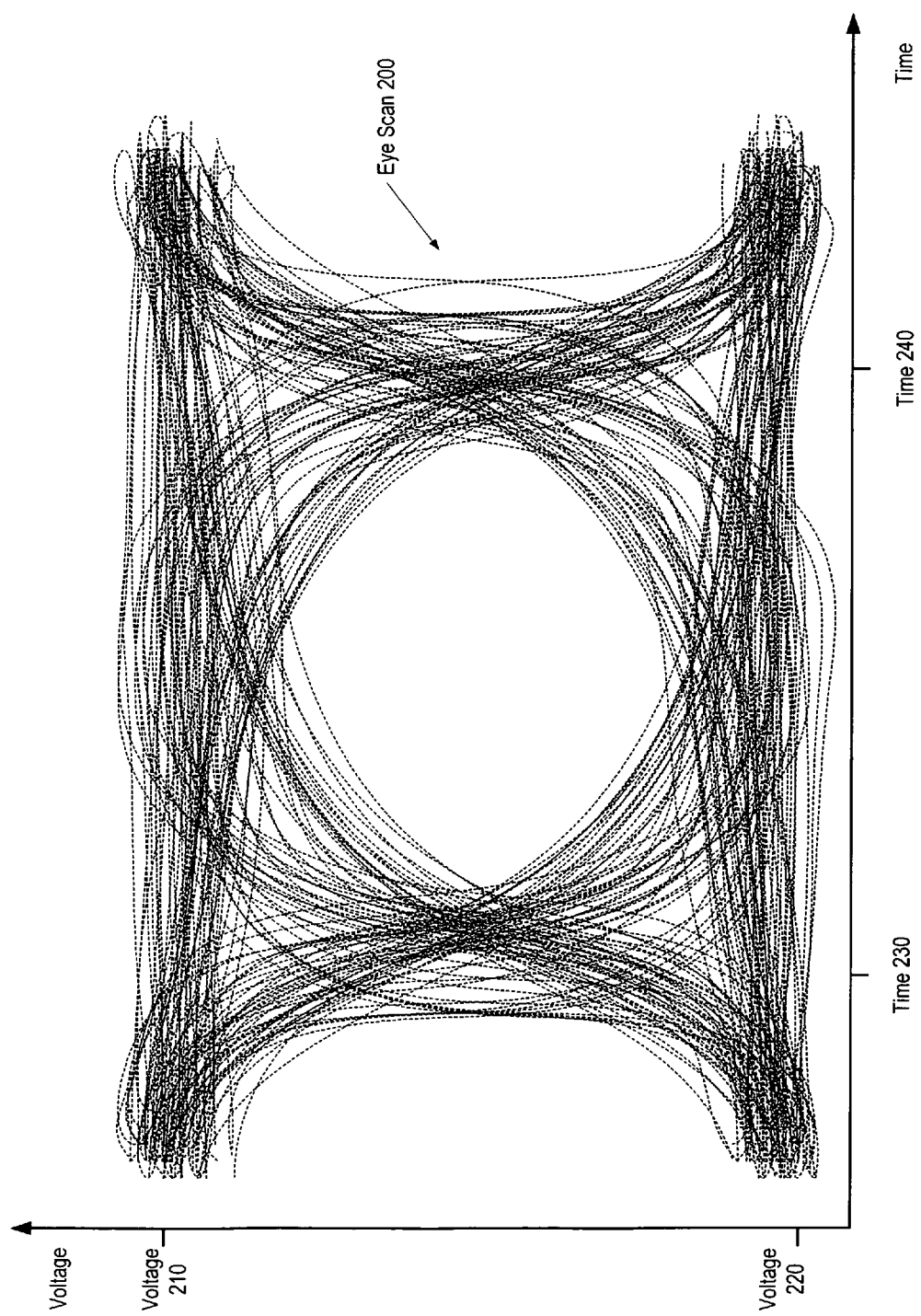
FIG. 2 illustrates one example of an eye diagram of a lane of a serial communications link.

FIG. 2 illustrates one example of an eye scan pattern 200. Pattern 200 may be constructed by sampling a received waveform over a large number of cycles, slicing the waveform into sections that extend over two clock transitions with a fixed phase offset from a reference clock, and superimposing the results. Each point on the resulting time-voltage graph may represent a digital sample of the signal voltage in a lane under test at a time measured with respect to the reference clock. For example, in one embodiment, voltage 210 represents an ideal, noise-free logic "1" and voltage 220 represents an ideal, noise-free logic "0". Times 230 and 240 may represent two consecutive ideal, jitter-free transition points of the reference clock. An eye scan measurement may comprise counting the number of samples that deviate more than a pre-determined time increment from the ideal transition times 230 and 240 and/or the number of samples that deviate more than a pre-determined voltage increment from the ideal voltages 210 and 220. Conceptually, this measurement may be thought of as counting the number of samples that fall within an area defined by a mask that fits in the middle of the eye diagram. Alternatively, in one embodiment, an eye scan may be used to determine the minimum separation between the mask and the samples that form the time-voltage graph. In this case, the measured separations in voltage and time may be referred to as a voltage margin and a time margin respectively. A variety of mask sizes and/or shapes may be chosen, depending on the desired performance of the lane under test.

During normal data communications, the clock frequency and phase of a serial bit stream may be recovered by a clock recovery circuit included in each of deserializers 122A-122C. Similarly, deserializers 122A-122C may include circuitry for detecting the voltages that correspond to logic levels "0" and "1" of a serial bit stream. Deserializers 122A-122C may convey the detected clock timing and voltage levels to monitor 127 for use in sampling the received waveform to form the eye scan. It will be appreciated that service processor 140 may be configured to employ any of a variety of sampling, thresholding, and averaging techniques to obtain eye scan time and voltage margin measurements. For instance, service processor 140 may configure one or more of deserializers 122A-122C or monitor 127 to adjust the phase offset between an ideal transition time and the time at which a voltage is sampled. One or more of deserializers 122A-122C or monitor 127 may also be configured to add an adjustable offset voltage to the signal voltage to be sampled from a lane under test in order to center the eye diagram within the available voltage range of monitor 127. In one embodiment, service processor 140 may execute an analysis of the eye scan to determine the optimum phase offset and voltage thresholds to minimize the bit-error-rate experienced on a lane under test. The resulting phase offset and voltage threshold values may be conveyed to one or more of deserializers 122A-122C or monitor 127 for use in sampling the eye scan as well as to each of deserializers 122A-122C for subsequent use in sampling non-test data.

Figure 3:
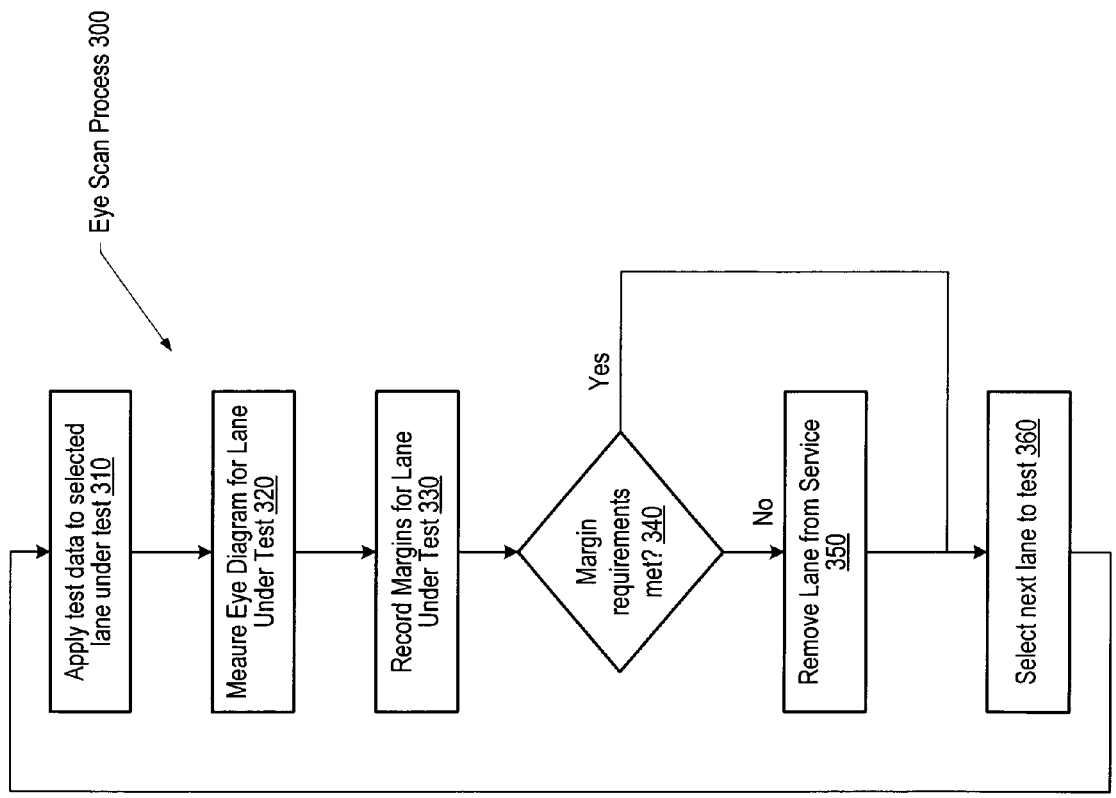
FIG. 3 illustrates one embodiment of a process that may be executed by a service processor to perform a series of eye scan tests of a serial communications link while the link is in service.

FIG. 3. illustrates one embodiment of a process 300 that may be executed to perform a series of eye scan tests of a serial communications link (e.g., link 130 in FIG. 1) while the link is in service. Generally speaking process 300 may be executed any time there is a desire to test the performance margins of a communications link. For instance, process 300 may be employed in a system that has been partially or fully assembled and is undergoing stress test prior to shipment to a customer. Alternatively, process 300 may be used as part of an installation verification procedure at a customer sight. Process 300 may provide a way to rapidly evaluate the performance margins of communications links, thereby permitting 100% testing of links in systems that are produced in large quantities. In addition, process 300 may be executed as part of a failure analysis to determine which lane of a link has failed or is experiencing poor performance margins while in service. Furthermore, because eye scan testing is generally used to measure time and voltage margins, process 300 may be able to detect poor margins in links that may lead to early degradation of performance, something that conventional tests might miss.

Process 300 may begin with the selection of a lane for eye scan testing and the application of a test signal from test data source 117 while a selected stress stimulus is applied to surrounding circuitry throughout system 100 (block 310). Having established the desired operating conditions for an eye scan test, eye scan measurements may then be performed on the lane under test (block 320). Details of various embodiments of an eye scan have been described above with reference to FIG. 2. Voltage and time margins may then be measured and recorded for the lane under test (block 330). If the measured voltage and/or time margins are found to be unacceptable (decision block 340), the lane under test may be removed from service (block 350). Alternatively, instead of removing the lane from service, the test results may be stored and a user alerted of the test findings. Further, the eye scan test results might be used to determine parameteric settings of serializers 115A-115C or deserializers 122A-122C that allow optimal link electrical operation. For example, eye scan during system operation under stress tests to make a worst possible electrical environment for the lane under test could be used to determine the optimal operating parameters for transmitter 110, serializers 115A-115C, receiver 120, and deserializers 122A-122C. If the lane under test is operating within desired margins or after removing the lane from service or storing test results, another lane may be selected to be tested (block 360) and the eye scan process repeated (block 310).

Figure 4:
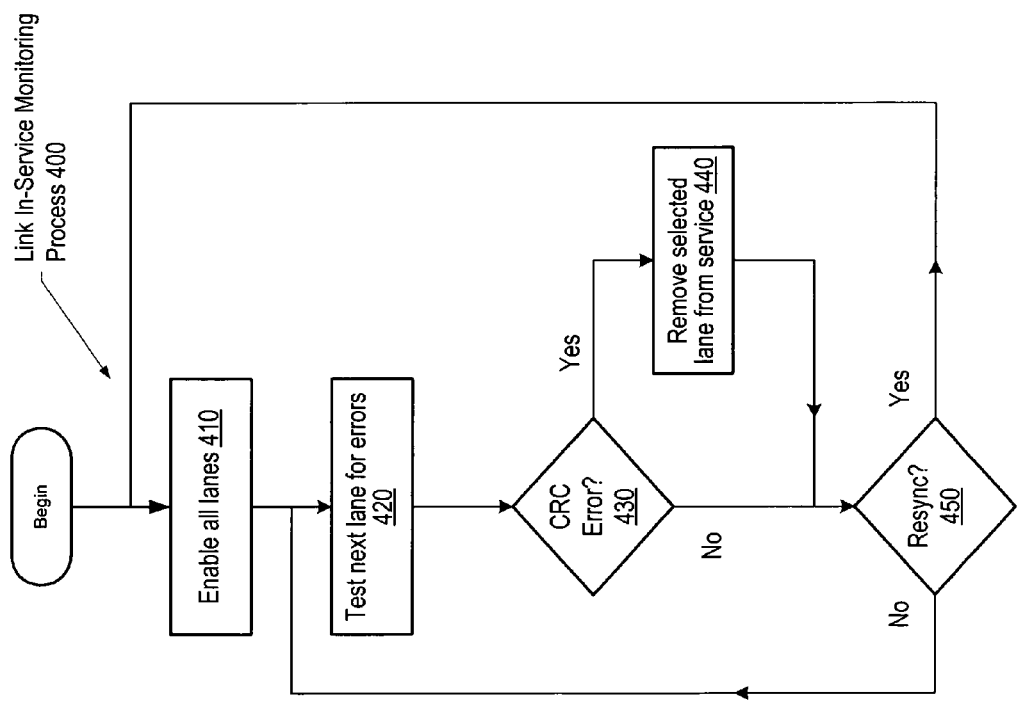
FIG. 4 illustrates one embodiment of a process that may be executed by a service processor to monitor a serial communications link while it is in service.

FIG. 4 illustrates one embodiment of a process 400 that may be performed to monitor a serial communications link while it is in service. In the illustrated embodiment, all lanes of a link are enabled to be monitored (block 410). Once all lanes are enabled, a particular lane is selected to be monitored (block 420). Having selected a lane, the lane is then tested to determine if the lane is functioning properly (decision block 430). In one embodiment, testing a lane may include querying a monitor such as monitor 127 to determine if a CRC check has detected an error in the selected lane. Alternatively, a count of the number of errors occurring in the selected lane may be monitored. In other embodiments, upon receiving a signal indicating that an error has been detected in a selected lane, a signal may be conveyed to the corresponding transmitter instructing it to attempt to re-send the same data one or more times. After a configurable number of unsuccessful attempts, it may then be determined that the selected lane has become unusable or is otherwise unavailable. If it is determined that a selected lane is unusable or unavailable, the selected lane may be removed from service (block 440). Because removing a lane from service reduces the number of lanes available for transmission of data through a corresponding link, the data source and data receiver may then be configured to communicate data over the remaining lanes. Once the selected lane has been removed from service or it is determined that the selected lane is functioning properly, it may then be determined (e.g., based on external input) whether to continue monitoring the operating lanes or to resynchronize all lanes (decision block 450). If a resync is not desired, the flow may return to block 420 to select the next lane to be monitored. Otherwise, the flow may return to block 410 to enable all lanes.

Figure 5:
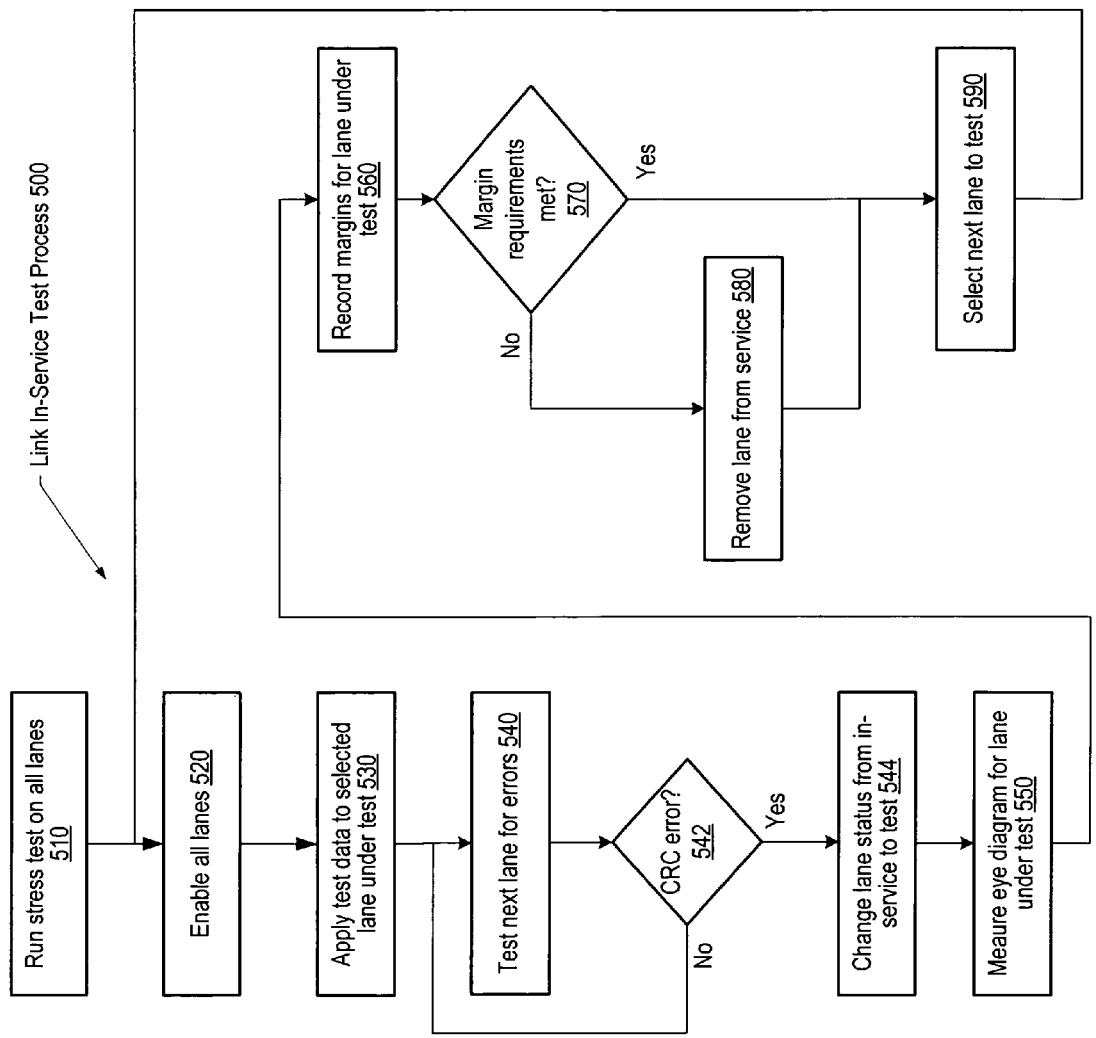
FIG. 5 illustrates an alternative embodiment of a process that may be executed by a service processor to perform a series of eye scan tests of a serial communications link while the link is in service.

FIG. 5 illustrates an alternative embodiment of a process 500 that may be executed to perform a series of eye scan tests of a serial communications link while the link is in service. Initially, a stress stimulus is applied to each of the lanes while executing the monitoring process 400 shown in FIG. 4 to test for errors (block 510). This preliminary stress test may be used to detect lanes that are experiencing a hard failure or are otherwise unavailable and therefore would not generally be tested using an eye scan. Once it has been determined which lanes are functioning properly, these lanes may be enabled (block 520). Once the lanes are enabled, a lane is selected for eye scan testing and supplied with a test signal from a test data source while a selected stress stimulus is applied to surrounding circuitry throughout system 100 (block 530). Each lane of the link is then tested for errors using a process such as process 400 as described above. For instance, a service processor may test a selected lane for errors (block 540) and loop through decision block 542. If no error is found, another lane is selected in block 540. Once an error is found, indicating that this is the lane that has been configured to receive the test signal, the status of this lane may be changed from in-service to ready-for-test (block 544). It is noted that a service processor or data receiver 125 may take advantage of a process such as process 400 to monitor the lanes of the link and automatically route non-test data through all available lanes excluding the lane under test. Consequently, normal communications may continue while eye scan testing is being conducted.

Having established the desired operating conditions for an eye scan test, eye scan measurements may be performed on the lane under test (block 550). The details of various embodiments of an eye scan have been described above with reference to FIG. 2. Voltage and time margins may be measured and recorded for the lane under test (block 560). If the measured voltage and/or time margins are found to be unacceptable (decision block 570), the lane under test may be removed from service (block 580). Alternatively, instead of removing the lane from service, the test results may be stored and, optionally, a user alerted of the test findings. If the lane under test is operating within desired margins or after removing the lane from service or storing test results, another lane may then be selected to be tested (block 590) and the flow in FIG. 5 may return to block 520 to repeat the eye scan process.

It is noted that the above described embodiments may comprise software. In such an embodiment, the program instructions which implement the methods and/or mechanisms may be conveyed or stored on a computer accessible medium. Numerous types of media which are configured to store program instructions are available and include hard disks, floppy disks, CD-ROM, DVD, flash memory, programmable ROMs (PROM), random access memory (RAM), and various other forms of volatile or non-volatile storage. Still other forms of media configured to convey program instructions for access by a computing device include terrestrial and non-terrestrial communication links such as network, wireless, and satellite links on which electrical, electromagnetic, optical, or digital signals may be conveyed. Thus, various embodiments may further include receiving, sending or storing instructions and/or data implemented in accordance with the foregoing description upon a computer accessible medium.

Although the embodiments above have been described in considerable detail, numerous variations and modifications will become apparent to those skilled in the art once the above disclosure is fully appreciated. For example, while a service processor is described as performing various functions in the above description, the functionality which is described may be performed by a processor, or processing unit, include in a transmitter, receiver, or otherwise. It is intended that the following claims be interpreted to embrace all such variations and modifications.

What is claimed is:

1. A system comprising:
 a transmitter;
 a receiver coupled to the transmitter, wherein the receiver is configured to compare a received data stream to an expected data stream and record errors;
 a digital communications link including a plurality of lanes through which the transmitter is coupled to the receiver; and
 a processor coupled to each of the transmitter and the receiver, wherein in response to the receiver detecting an error in a selected lane of the plurality of lanes, the processor is configured to:
  switch the selected lane from an operating mode to a test mode;
  perform an eye scan of the selected lane;
  analyze the eye scan to determine a resulting sample phase, a high voltage threshold, and a low voltage threshold;
  convey an indication to each of the transmitter and the receiver to remove the selected lane from service, in response to determining measured voltage and/or time margins of the eye scan found during said analyzing do not satisfy predetermined conditions; and
  convey the resulting sample phase, high voltage threshold, and low voltage threshold to the receiver if the selected lane is not removed from service;
 wherein the receiver is configured to:
  receive the resulting sample phase, high voltage threshold, and low voltage threshold conveyed from the processor;
  sample the selected lane at the received sample phase to obtain a resulting voltage sample; and
  compare the resulting voltage sample to the received high and low voltage thresholds to determine whether the resulting voltage sample represents a logic "0" or a logic "1".

2. The system of claim 1, wherein the operating mode comprises converting a parallel data stream into a set of serial bit streams, and wherein each serial bit stream is conveyed from the transmitter to the receiver via a respective one of the plurality of lanes.

3. The system of claim 1, wherein while performing an eye scan the processor is further configured to cause a pseudo-random binary sequence (PRBS) to be transmitted through the selected lane.

4. The system of claim 1, wherein, during an eye scan, the system is operated with a stress test to generate a worst case operating noise environment for a lane under test.

5. The system of claim 1, wherein the processor is further configured to return the selected lane to an operating mode, in response to the measured voltage and/or time margins of the eye scan found during said analyzing satisfy the predetermined conditions.

6. The system of claim 1, wherein the processor is further configured to convey an indication to each of the transmitter and the receiver to reconfigure to communicate data over the remaining lanes if the selected lane is removed from service.

7. The system of claim 1, further comprising a plurality of transmitters and a plurality of receivers;
    wherein a first transmitter and a first receiver are fabricated on a first integrated circuit chip;
    wherein a second transmitter and a second receiver are fabricated on a second integrated circuit chip; and
    wherein the digital communications link couples the first transmitter to the second receiver and the second transmitter to the first receiver.

8. The system of claim 1, wherein the digital communication link is part of a backplane in a computer system.

9. A method of testing a digital communications link coupling a transmitter, receiver and processer, the method comprising:
    the receiver comparing a received data stream from the transmitter to an expected data stream and recording errors;
    in response to the receiver detecting an error in a selected lane of the plurality of lanes, the processor:
        switching the selected lane from an operating mode to a test mode;
        performing an eye scan of the selected lane;
        analyzing the eye scan to determine a resulting sample phase, a high voltage threshold, and a low voltage threshold;
        conveying an indication to each of the transmitter and the receiver to remove the selected lane from service, in response to determining measured voltage and/or time margins of the eye scan found during said analyzing do not satisfy predetermined conditions; and
        conveying the resulting sample phase, high voltage threshold, and low voltage threshold to the receiver if the selected lane is not removed from service;
    the receiver:
        receiving the resulting sample phase, high voltage threshold, and low voltage threshold conveyed from the processor;
        sampling the selected lane at the received sample phase to obtain a resulting voltage sample; and
        comparing the resulting voltage sample to the received high and low voltage thresholds to determine whether the resulting voltage sample represents a logic "0" or a logic"1".

10. The method of claim 9, wherein the operating mode comprises:
    converting a parallel data stream into a set of serial bit streams; and
    conveying each serial bit stream over a respective one of the plurality of lanes.

11. The method of claim 9, further comprising the processor conveying an indication to each of the transmitter and the receiver to reconfigure to communicate data over the remaining lanes if the selected lane is removed from service.

12. The method of claim 9, further comprising running system operation stress tests to generate a worst possible system environment for a lane under test during eye scan measurements.

13. The method of claim 9, further comprising the processor returning the selected lane to an operating mode, in response to the measured voltage and/or time margins of the eye scan found during said analyzing satisfy the predetermined conditions.

14. A non-transitory computer-readable storage medium comprising program instructions for use in a system comprising a digital communications link coupling a transmitter, receiver, and processor, wherein the program instructions are executable by a processor to cause:
    the receiver to compare a received data stream from the transmitter to an expected data stream and recording errors;
    in response to the receiver detecting an error in a selected lane of the plurality of lanes, the processor to:
        switch the selected lane of a digital communications link from an operating mode to a test mode;
        perform an eye scan of the selected lane;
        analyze the eye scan to determine a resulting sample phase, a high voltage threshold, and a low voltage threshold;
        convey an indication to each of the transmitter and the receiver to remove the selected lane from service, in response to determining measured voltage and/or time margins of the eye scan found during said analyzing do not satisfy predetermined conditions; and
        convey the resulting sample phase, high voltage threshold, and low voltage threshold to the receiver if the selected lane is not removed from service;
    the receiver to:
        receive the resulting sample phase, high voltage threshold, and low voltage threshold conveyed from the processor;
        sample the selected lane at the received sample phase to obtain a resulting voltage sample; and
        compare the resulting voltage sample to the high and low voltage thresholds to determine whether the resulting voltage sample represents a logic "0" or a logic"1".

15. The non-transitory computer-readable storage medium of claim 14, wherein the operating mode comprises:
    converting a parallel data stream into a set of serial bit streams; and
    conveying each serial bit stream over a respective one of the plurality of lanes.

16. The non-transitory computer-readable storage medium of claim 14, wherein the program instructions are further executable by a processor to convey an indication to each of the transmitter and the receiver to reconfigure to communicate data over the remaining lanes if the selected lane is removed from service.

17. The non-transitory computer-readable storage medium of claim 14, wherein the program instructions are further executable by a processor to return the selected lane to an operating mode, in response to the measured voltage and/or time margins of the eye scan found during said analyzing satisfy the predetermined conditions.

* * * * *